United States Patent [19]

Matsumoto et al.

[11] Patent Number: 4,582,098

[45] Date of Patent: Apr. 15, 1986

[54] METHOD OF FABRICATING ELECTRODES FOR BATTERY

[75] Inventors: Isao Matsumoto, Osaka; Masakazu Ikeyama, Katano; Koichi Inoue, Moriguchi; Minoru Yamaga, Chigasaki, all of Japan

[73] Assignee: Matsushita Electric Industrial Co., Ltd., Kadoma, Japan

[21] Appl. No.: 626,839

[22] PCT Filed: Oct. 25, 1983

[86] PCT No.: PCT/JP83/00376

§ 371 Date: Jul. 2, 1984

§ 102(e) Date: Jul. 2, 1984

[87] PCT Pub. No.: WO84/01858

PCT Pub. Date: May 10, 1984

[30] Foreign Application Priority Data

Nov. 1, 1982 [JP] Japan ............................... 57-192971

[51] Int. Cl.[4] .......................... B65B 3/04; H01M 4/04

[52] U.S. Cl. .................................................... 141/1.1

[58] Field of Search ............................ 141/1.1, 32, 33

[56] References Cited

FOREIGN PATENT DOCUMENTS 2066110A 7/1981 United Kingdom .

*Primary Examiner*—Houston S. Bell, Jr.

*Attorney, Agent, or Firm*—Wenderoth, Lind & Ponack

[57] ABSTRACT

An improved method of fabricating electrodes used in nickel-cadmium storage batteries, etc. A pasty mixture is sprayed from both sides onto a porous metal body having three-dimensional communicating spaces so as to fill the pasty mixture, which has been previously prepared, into the spaces of the porous metal body with good reproducibility. The amount of active material filled into the spaces can be easily controlled. Thus, electrodes having a desired capacity can be mass-produced.

4 Claims, 7 Drawing Figures

2

1

3

4

5

METHOD OF FABRICATING ELECTRODES FOR BATTERY

TECHNICAL FIELD

The present invention relates to a method of fabricating electrodes for a battery. More particularly, it relates to a method wherein a pasty mixture is sprayed from both sides onto a porous metal body which has three-dimensional communicating spaces so as to fill the mixture, which has been adjusted in advance, into the spaces of the porous metal body with good reproducibility.

BACKGROUND ART

Electrodes for batteries are roughly classified into three types: the paste type electrode in the form of a lattice or net serving as an active material supporting body and having a pasty active material filled thereinto, the sintered type electrode in the form of a sintered metal base plate with an active material filled into its micropores, and the pocket type electrode in the form of a microporous tube or pocket with a powdery active material filled thereinto.

The paste type electrode is well-known as a lead storage battery electrode and in some cases it is also used as a cadmium electrode for nickel-cadmium storage batteries. Although this electrode is relatively easy to produce, its pasty active material tends to come off and the ruggedness of the electrode is not satisfactory. The pocket type electrode involves a problem that it is lower in active material utilization percentage than the paste type electrode and sintered type electrode.

The sintered type electrode is superior to the other two types with respect to its electrode characteristics and ruggedness. However, the sintered base plate is an expensive material and the operation of filling a necessary amount of active material into the micropores of the base plate makes it necessary that immersion in an active material solution and thermal decomposition be performed several times and that the base plate be immersed in such active material solution to effect electrolytic deposition; thus, as compared with the other types, it requires a complicated process for its fabrication, and the cost of this type of electrode is the highest.

Recently, there has been proposed an electrode, similar to the sintered type electrode, using a foamed porous metal body (hereinafter referred to as sponge metal) as a base body with a pasty active material filled thereinto. The sponge metal has a three-dimensional reticulated structure, a porosity of as high as 95%, and a large pore diameter, and during production the pore diameter can be optionally selected. Therefore, by suitably selecting the pore diameter it is possible to fill a pasty active material or a powder of active material directly into the pores and hence this electrode is characterized in that it can be produced in a much simpler process than in the case of the sintered type electrode.

Among the practical methods of filling an active material into this sponge metal are a method which imparts vibrations to the pasty active material, a method which rubs in the pasty active material, a method which contacts the pasty active material with one surface of the sponge metal while applying suction to the other surface so as to fill it thereinto, and a method which sprays the pasty active material onto the sponge metal through a nozzle.

Of these methods, the rubbing method and the spraying method are suitable for uniform filling of an active material into the pores of the sponge metal. A comparison of these two methods shows that the spraying method, in which there is no possibility of the nozzle coming in contact with the sponge metal, is superior to the rubbing method in the durability and ease of maintenance of the device used for filling.

Such a spray method of filling a pasty active material into sponge metal is disclosed in Japanese Patent Publication No. 20664/1981. The spray method, though having merits concerning the device, results in some difficulty in filling a pasty active material so that it has a uniform composition throughout the sponge metal.

That is, if a pasty active material is simply supplied at a given flow rate and sprayed by a nozzle, the non-uniformity of dispersion of the powder particles (solid component) in the paste results in the non-uniformity of the composition of the paste after it has been filled into the pores of the sponge metal, or too much air entering the paste results in a sponge cake form, making substantial filling of the active material impossible or greatly increasing the variation of the filling.

Further, if the spray nozzle is positioned merely at one side of the sponge metal and a pasty active material is sprayed, a paste portion containing a relatively large amount of powder will be filled into the sponge metal surface nearer to the nozzle but a paste portion containing less powder than the paste portion on said surface penetrates into the center of the thickness of the sponge metal and the back surface of the sponge metal farthest from the nozzle will be filled only with a paste portion having a greater amount of the binding agent solution having a greater penetrating ability than the powder and will have little powder content, or the passage of the paste is impeded and hence filling is substantially impossible. Therefore, the method is unsatisfactory from the standpoint of filling a preadjusted composition paste into the entire volume sponge metal with good uniformity.

DISCLOSURE OF INVENTION

An object of the present invention is to fill a preadjusted composition pasty active material into the spaces of a porous metal body with good uniformity by spraying it from both sides onto said porous metal body, wherein the amount of air in the pasty mixture is controlled and the pasty active material has a powder of an active material uniformly dispersed therein.

More particularly, an object of the invention is to provide an arrangement wherein a porous metal body having three-dimensional communicating spaces, such as the aforesaid sponge metal or a non-woven porous body of metallic fiber, is used as an electrode base body, while a preadjusted composition pasty mixture is stirred to uniformly disperse powder particles of active material and electrically conductive powder particles and the mixture is then fed to nozzles through a sealed transport line by an air-tight pump, whereby the pasty mixture is filled into the spaces of the electrode base body from both sides thereof.

To achieve the aforesaid objects, according to the invention, a pasty mixture consisting of an active material powder, an electrically conductive powder, and a binding agent is stirred to uniformly disperse the powder materials and is then fed to nozzles through a sealed transport line by an air-tight pump, e.g., a Moineau pump or a diaphragm pump, and with the amount of air in the pasty mixture at the nozzle tip being controlled so that it is 10 volume percent or less at normal pressure, the pasty mixture is sprayed into the spaces of the electrode base body consisting of the porous metal body by the two nozzles disposed on both sides of the base body.

An apparatus for carrying out the method of the invention comprises a tank filled with a pasty mixture which is constantly stirred, a pump sucking the paste and imparting a flow speed thereto, a transport line such as a sealed piping for moving the paste from the pump to nozzles, and such nozzles for spraying the paste onto an electrode base body from both sides to fill it thereinto.

BEST MODE OF CARRYING OUT THE INVENTION

Figure 1:
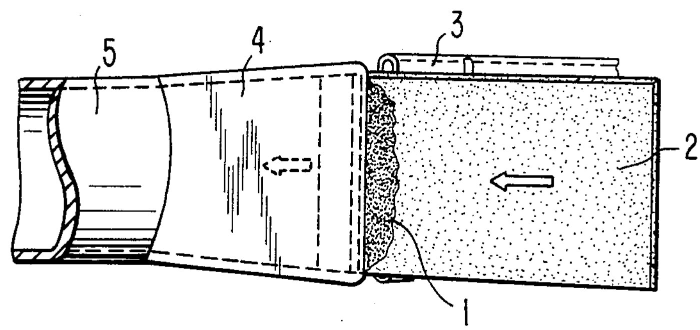
FIG. 1 is a perspective view showing the layout of nozzles for spraying a paste from both sides onto a porous metal body which is an electrode base body in one embodiment of the invention.

The arrangement of each part of an apparatus for carrying out the present invention, and a specific method of spray-filling a paste into an electrode base body will now be described with reference to the embodiments shown in the drawings.

FIG. 1 is a view showing an arrangement wherein a porous metal body 2 which is a band-like electrode body is horizontally moved with its width direction coinciding with the vertical direction, while filling is effected by nozzles 3 and 4 positioned on both sides in opposed relation and spraying a paste 1. In the figure, 5 denotes a paste transport piping.

Figure 2:
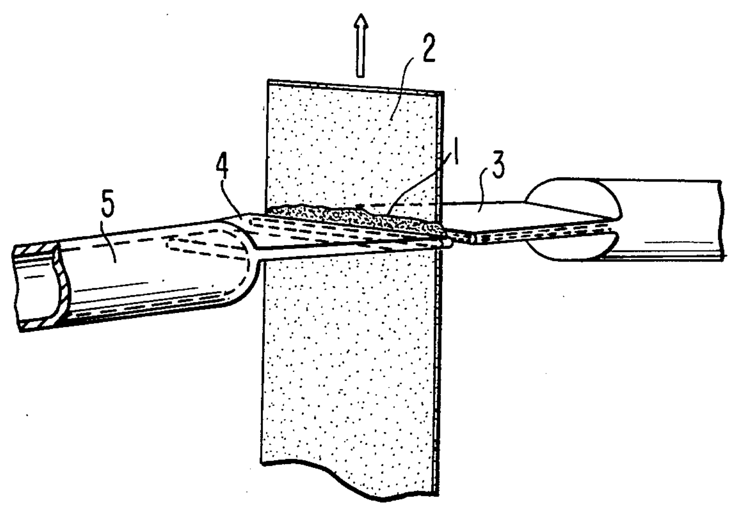
FIG. 2 is a perspective view showing another example of a nozzle layout.

FIG. 2 shows an arrangement wherein a porous metal body 2 which is an electrode base body is moved vertically upward, while filling is effected by nozzles 3 and 4 horizontally disposed on both sides in opposed relation and spraying a paste 1.

Figure 3:
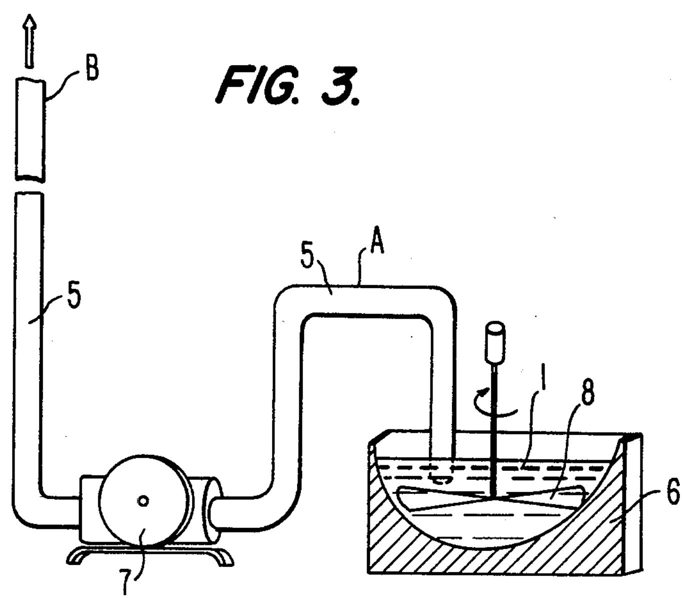
FIG. 3 is a schematic view showing the relation between a tank containing a preadjusted composition paste, an air-tight pump for feeding the paste to the nozzles, and a sealed transport line.

FIG. 3 shows the schematic arrangement of an apparatus wherein from a tank 6 filled with a paste 1, the paste 1 is sucked by an air-tight pump 7 and transported to nozzles through a sealed piping 5. In addition, to uniformly disperse the powder particles in the paste 1, it is advisable that a stirrer 8 having two vanes embedded in the paste 1 be rotated at 2–4 rpm and that the top of the tank 6 be shielded to prevent unnecessary entry of air into the paste.

EXAMPLE 1

To begin with, the porous metal body which is an electrode base body, whether it is sponge metal described above or a non-woven porous body of metallic fiber, has three-dimensional communicating spaces and, though varying in porosity and in mechanical strength, has substantially the same nature. Therefore, sponge nickel for nickel electrodes will be used as a representative material in the following description.

A band-like sponge nickel base body about 1.3-mm thick having a porosity of about 95% and substantially spherical spaces of about 450 μm in average diameter was prepared.

On the other hand, as the paste 1, hydroxide nickel powder, carbonyl nickel powder, and carbonyl cobalt powder, having particles about 60 μm in average diameter, were mixed in a ratio of 85:10:5, and an aqueous solution of 0.3 weight percent carboxymethyl cellulose which is a binding agent was added to the mixture, the amount of solution added being 35 weight percent of the total paste, and the mixture was kneaded.

This paste 1 was received in the tank 6 shown in FIG. 3, where the stirrer 8 was rotating normally, e.g., at 3 rpm for uniform dispersion of the powder materials. If the shield effect at the top of the tank 6 is kept in good condition, the amount of air entering the paste 1 can be restricted to 5 volume percent or less, at most, and normally to 2–3 volume percent.

The paste 1 in the tank 6 was sucked in through the inlet of the piping 5 by the sucking force of the air-tight pump 7 and given a flow speed by the rotative force of the pump 7 and was fed through the piping 5 to the nozzles 3 and 4.

The flow rate of the paste spouted from the nozzle tips was set at 3 m/sec and the distance between the sponge nickel and the nozzles 3 and 4 having a 2-mm wide slit-shaped spout port and disposed on both sides as shown in FIG. 1 was set at 20 mm, and the paste was sprayed onto the sponge nickel moving at 15 mm/sec.

Subsequently, the excessive paste adhering to the nickel surfaces was removed and, after drying, the sponge nickel was pressed to provide a 0.7-mm thick electrode. This band-like electrode was then cut to a predetermined size and immersed in an aqueous suspension containing 1 weight percent fluoride resin in solid form and then dried to provide a completed nickel electrode.

The most remarkable feature of this nickel electrode producing method is that the paste being stirred to uniformly disperse the powder materials is transported, with a minimum amount of air contained therein, to the nozzles by the air-tight pump and sealed piping and is sprayed from both sides onto the sponge nickel which is an electrode base body; thus, the paste can be filled into the spaces of the nickel sponge in such a manner that the condition of the composition of the preadjusted paste is substantially reproduced. A first reason why the paste can be filled into the spaces of the sponge nickel with the initial condition of the paste reproduced is that the reduction of the amount of air entering the paste to a value which, according to our study, is 10 volume percent or less, makes it possible to prevent the paste from turning into sponge cake due to the formation of air bubbles. A second reason is that the spraying of the paste onto the sponge nickel by the nozzles disposed in opposed relation on both sides of the sponge nickel ensures that the uniformity of the powder throughout the paste in the spaces in the direction of the thickness of the sponge nickel is substantially the same as when it was initially prepared.

That is, the reduction of the amount of air entering the paste makes it possible to maintain at a high value the substantial amount of active material filled into the spaces of the sponge nickel and to minimize the number of dead spaces which air enters in bubble form. Further, spraying the paste onto the sponge nickel from both sides, although resulting in some of the paste rebounding from the surface of the sponge nickel, ensures that the greater part enters the three-dimensional communicating spaces in such a manner that in the middle of the thickness of the sponge nickel, one part coming from one side hits against the other coming from the other side, pushing some of the liquid component back to the surfaces while causing it to branch off toward the middle of the thickness not opposed to the nozzles; thus, there is no possibility that the portion of the paste entering the middle region of the sponge nickel is abnormally rich in the highly penetrating liquid component.

As a result, the paste can be filled into the spaces with a paste composition not much differing from the initially formed paste composition, throughout the thickness of the sponge nickel, and with good reproducibility.

EXAMPLE 2

The same sponge nickel as in Example 1 was used as an electrode base body and the paste was prepared in the same composition and by the same stirring operation as in Example 1 and sprayed through the two nozzles onto the sponge nickel vertically moving at 15 mm/sec.

EXAMPLE 3

The paste composition in Example 1 was changed such that the amount of the aqueous solution of binding agent in the paste was 30 weight percent, the other conditions being the same as in Example 1. The paste was sprayed onto the sponge nickel from both sides thereof.

EXAMPLE 4

The paste in Example 1 was changed such that it consisted principally of cadmium oxide rather than nickel hydroxide, and the paste was sprayed. That is, cadmium oxide powder and carbonyl nickel powder 3 $\mu$m in average particle size, were mixed in a weight ratio of 80:20, and an aqueous solution of 0.3 weight percent carboxymethyl cellulose was added to this powder mixture such that the amount of said solution was 35 weight percent of the total paste. The paste was sprayed onto the sponge nickel from both sides. Other conditions than for the paste were the same as in Example 1.

In the spray-filling of the paste in these examples, the relation between the amount of air entering the paste in the pump and sealed transport line and the filling density of the paste in the sponge nickel was investigated.

In addition, it was so arranged that the amount of air entering the paste was adjusted by installing a valve in a portion A of the piping between the tank 6 and the pump 7 in FIG. 3. With consideration being given to the entry of air from the pump and piping, the actual amount of air entering the paste being sprayed from the nozzle spout ports was measured at a portion B of the piping close to the nozzles.

Figure 4:
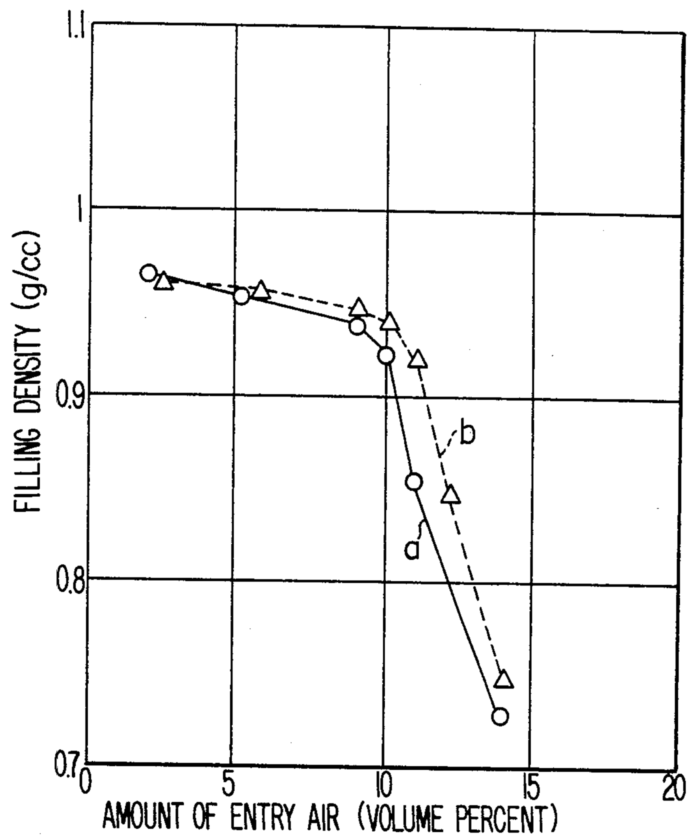
FIG. 4 is a graph showing the relation between the amount of air in the paste and the filling density in the electrode base body.

The result is shown in FIG. 4, from which it is seen that if the amount of entry air is 10 volume percent or less, a high filling density of paste in the spaces of the sponge nickel is obtained and that if it exceeds 10 volume percent, the filling density sharply decreases. In addition, a in the graph corresponds to the use of the paste consisting mainly of nickel hydroxide in Example 1 and b corresponds to the use of the paste consisting mainly of cadmium oxide in Example 4.

As is clear from the graph, the filling density depends only slightly on the particle size of the powders forming the paste but greatly on the amount of air entering the paste.

Figure 5:
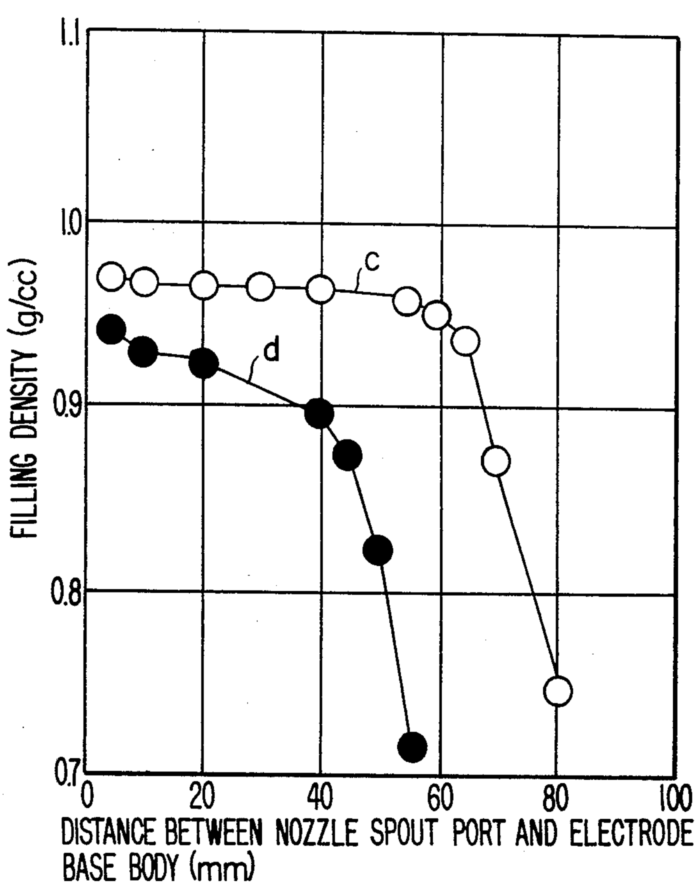
FIG. 5 is a graph showing the relation between the distance between the nozzle spout port and the electrode base body, and the filling density of the paste.

Further, the distance between the sponge nickel and the nozzle spout port also influences the filling density of paste. In the case where the paste is sprayed from both sides, a distance of up to 60 mm between the nozzles and the sponge nickel enables the past to be efficiently filled into the spaces of the sponge nickel with little decreases in the filling density, as shown at c in FIG. 5. However, in the case d where only one nozzle is used to spray the paste onto one side of the sponge nickel, not only is the amount of paste filled into the nickel insufficient but also the paste is filled such that its presence is biased to one side opposed to the nozzle, and the greater the distance, the more the paste is spattered and the greater the amount of air caught in, thus results in a sharp decrease in the filling density of paste.

Figure 6:
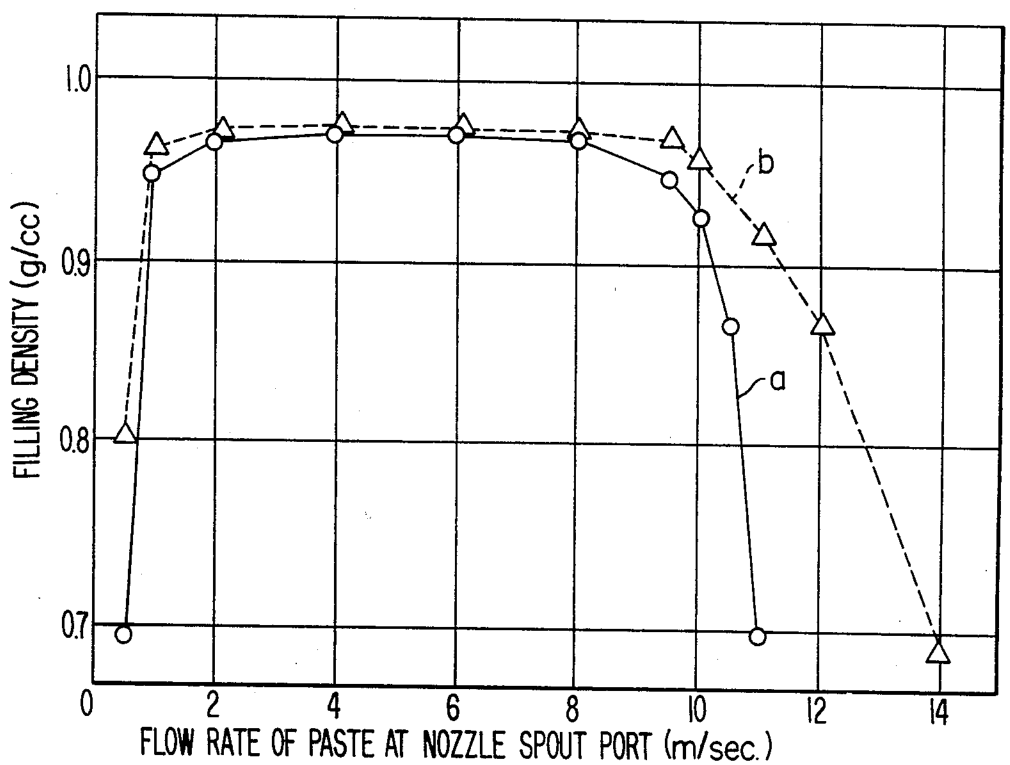
FIG. 6 is a graph showing the relation between the flow rate of the paste at the nozzle spout port, and its filling density.

. The filling density of paste also depends on the flow rate of the paste at the nozzle spout port. FIG. 6 shows the relation between the flow rate of the paste at the nozzle spout port and the filling density of paste in the sponge nickel. In the figure, a corresponds to the aforesaid paste consisting mainly of nickel hydroxide and b corresponds to the paste consisting mainly of cadmium oxide. In each case, if the flow rate of the paste at the nozzle spout port is 1 m/sec or less, the energy of the paste flowing into the spaces of the sponge nickel is low and so is the filling density. However, if the flow rate is greater than 1 m/sec and less than 10 m/sec, the paste can be efficiently filled into the spaces of the sponge nickel. If the flow rate of the paste exceeds 10 m/sec, this results in the increased possibility of the paste rebounding from the sponge nickel surfaces or powder material in the paste entering the surface portion being driven away by another powder material which is later sprayed, so that the filling density becomes lower.

In addition, as is clear from FIG. 6, smaller particle sizes of powder materials in the paste tend to have higher filling densities than larger particle sizes. It seems that this is due to the facts that a more finely divided material enters the innermost regions of the spaces more easily and that even when the paste is continuously sprayed, the possibility of the paste flowing aside from the sponge nickel is minimized.

The electrode prepared by spray-filling the paste into the sponge nickel by the two nozzles directed to both sides of the sponge nickel was cut into one hundred, $39\times58$ mm segments, which were then tested for a variation in the filling density, the result being shown in I in the following table. In addition, II in the following table refers to a variation in the filling density for 100 electrode segments, the paste being filled by the previously described conventional rubbing method, III the paste being filled while having vibrations applied thereto, and IV the paste being filled by being contacted with one side of the sponge nickel, the other side being subjected to suction.

| Filling method | I | II | III | IV |
|---|---|---|---|---|
| Variation in filling density | ±4.0% | ±6.5% | ±25.5% | ±23.0% |

As is clear from this table, according to the method I, the variation in the filling density is small and the composition of the paste acutally filled into the sponge nickel is almost the samê as that of the initially prepared paste; thus, it is superior in the reproducibility of the paste composition. On the other hand, with the methods II, III, and IV, the variation in the filling density is large and the paste filled into the sponge nickel contains a small amount of binding agent solution as compared with the powder materials; thus, the reproduction of the initial paste composition is impossible.

Figure 7:
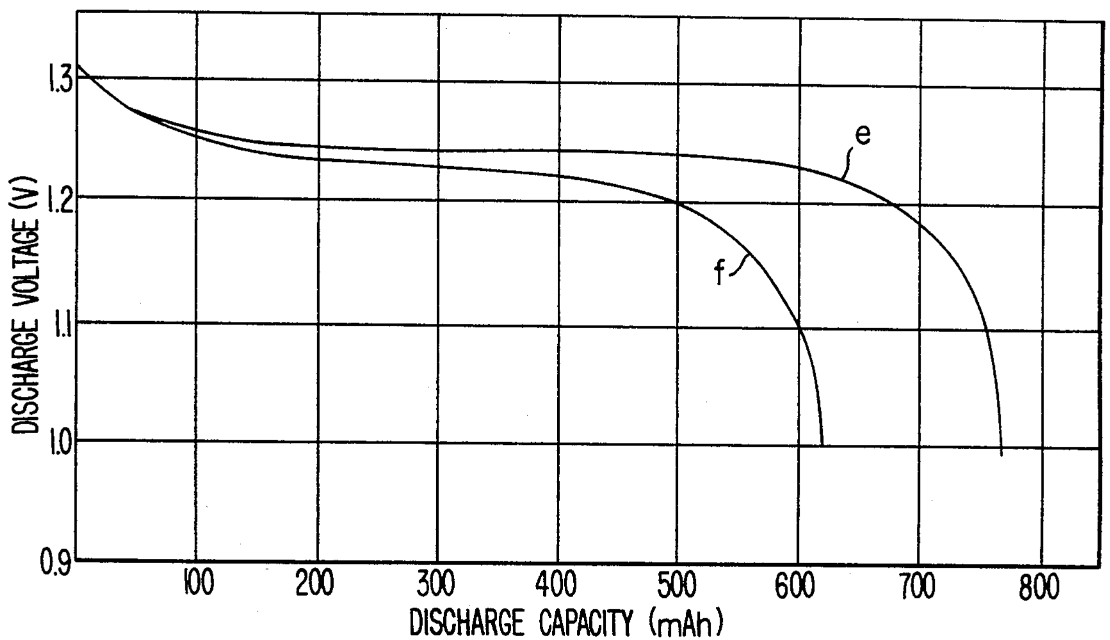
FIG. 7 is a graph showing the discharge curve of a battery using electrodes provided by the invention.

FIG. 7 shows an average electric discharge curve e obtained as follows: The nickel electrode obtained in Example 1 was cut into 39-mm wide, 58-mm long, and 0.7-mm thick segments, which were combined with general-purpose cadmium electrodes (39-mm wide, 80-mm long, and 0.55-mm thick) to prepare 10 nickel-cadmium batteries of the KR-AA type, which, after being charged with 70 mA for 16 hours, were discharged at 20° C. with a current value of 140 mA. For comparison purposes, the average discharge curve of batteries prepared in the same way as the above except that conventional sintered nickel electrodes were used is as shown at f.

From these facts it is seen that the battery having the electrodes provided by the present invention is superior in discharge capacity and discharge voltage.

INDUSTRIAL APPLICABILITY

As has so far been described, according to the production method of the present invention, a pasty mixture can be efficiently filled into a porous metal body having three-dimensional communicating spaces represented by sponge metal while substantially reproducing the condition of the initially adjusted paste, so that a battery electrode superior in quality and performance can be obtained. Further, the amount of filling active material can be easily controlled according to a paste mixture to be initially prepared and hence electrodes having a desired capacity can be mass-produced.

What is claimed is:

1. A method of fabricating electrodes for a battery comprising:

passing a porous metal body having three-dimensional communicating spaces between two spaced opposed nozzles on opposite sides of said porous metal body with the nozzles spaced from the surfaces of the metal body a distance greater than the thickness of a mixture to be sprayed onto the metal body on the surfaces of the metal body;

preparing a pasty active material mixture of a desired composition of powdered materials in a substantially air free container and with a viscosity for permitting penetration of the spaces in the metal body when the mixture is sprayed onto the metal body;

stirring said pasty mixture to uniformly disperse the powdered materials therein;

feeding said pasty mixture to the nozzles by an air-tight pump and a transport line sealed against ingress of air, the air free container, air tightness of the pump and the sealing of the transport line being sufficient to limit the amount of air in the pasty mixture at the nozzle tips to no more than 10 percent by volume of the mixture; and spraying the mixture onto both sides of the porous metal body with a force sufficient to cause the mixture to fill the spaces of said porous metal body.

2. A method as claimed in claim 1 in which the spray mixture consists principally of nickel hydroxide.

3. A method as claimed in claim 1 in which the pasty mixture consists principally of cadmium oxide.

4. A method as claimed in claim 1 in which the pasty mixture consists of an active material powder, an electrically conductive material powder, a binder and a solvent therefor.

* * * * *